(12) United States Patent
Barbara et al.

(10) Patent No.: US 8,095,747 B2
(45) Date of Patent: Jan. 10, 2012

(54) MEMORY SYSTEM AND METHOD

(75) Inventors: Bruce Barbara, Discovery Bay, CA (US); Gabriel Li, San Francisco, CA (US); Thinh Tran, Palo Alto, CA (US); Joseph Tzou, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 692 days.

(21) Appl. No.: 12/239,532

(22) Filed: Sep. 26, 2008

(65) Prior Publication Data

US 2010/0082861 A1 Apr. 1, 2010

(51) Int. Cl.
*G06F 12/00* (2006.01)
(52) U.S. Cl. ............ 711/154; 711/5; 711/115; 711/170; 711/171; 711/211; 711/212
(58) Field of Classification Search .............. 711/5, 115, 711/154, 170, 171, 211, 212
See application file for complete search history.

(56) References Cited

U.S. PATENT DOCUMENTS

| 7,013,359 | B1 | 3/2006 | Li |
| 2004/0054845 | A1 | 3/2004 | Ware et al. |
| 2007/0070669 | A1 | 3/2007 | Tsern |
| 2007/0255919 | A1 | 11/2007 | Ware et al. |
| 2008/0028126 | A1 | 1/2008 | Bartley et al. |
| 2008/0028176 | A1 | 1/2008 | Bartley |
| 2009/0164677 | A1* | 6/2009 | Ware et al. ............. 710/104 |

OTHER PUBLICATIONS

Nasr, Rami Marwan, "FBSIM and the Fully Buffered DIMM Memory System Architecture", University of Maryland, 2005, 138 pages.
International Search Report of International Searching Authority, dated Feb. 6, 2009 for International Application No. PCT/US08/86695; 2 pages.
International Written Opinion of International Searching Authority, dated Feb. 6, 2009 for International Application No. PCT/US08/86695; 7 pages.

* cited by examiner

*Primary Examiner* — John Lane

(57) ABSTRACT

In an embodiment, an apparatus includes a memory controller configured to control first and second memory components. A point-to-point data bus configured to pass data between the memory controller and the memory components may include a direct connection from each memory component to the memory controller. A daisy chained address bus configured to pass commands between the memory controller and the memory components may include a direct connection from the first memory component to the memory controller and a daisy chain connection from the first memory component to the second memory component.

18 Claims, 4 Drawing Sheets

MEMORY SYSTEM AND METHOD

TECHNICAL FIELD

The present disclosure relates generally to the field of memory systems.

BACKGROUND

A memory system includes a memory controller connected to one or more memory components via an address/command bus and a data bus. The memory controller sends commands over the address/command bus to control which memory component writes to and/or reads from a memory space represented by data stored on the memory components. Data to be written to one of the memory components is transferred from the memory controller to a corresponding one of the memory components over the data bus, while memory to be read is transferred from a corresponding one of the memory components over the data bus to the memory controller.

Some existing memory architectures use multi-drop connections from the memory controller to the memory components. A multi-drop connection includes a trace from the memory component that branches to the memory components. This branching of the trace creates signal reflections, which frustrates high frequency operation and accordingly limits throughput between the memory controller and the memory components.

Other issues of existing memory architectures are related to capacity. The storage capacity of a memory system is limited by many factors, including the system's word width. A word is typically equal to the bit width of the data bus extending from the memory controller.

Although extending word width can lead to larger capacities, e.g. a sixty four bit system can generally have greater memory capacity than a thirty two bit system, there are many tradeoffs. As word width is increased, routing the widened data buses becomes increasingly difficult. The complex data bus routing can result in data misalignment, where bits on each link of the data bus arrive at a component at different times. This data misalignment further frustrates high frequency operation, which again affects throughput between the memory controller and the memory components. Another tradeoff for increasing word width is the increased pin count, which greatly adds to the cost of manufacturing memory controllers and memory components.

Fully Buffered Dual In-Line Memory Modules (FB-DIMMs) partially address some of the limitations discussed above. Point-to-point connections from the memory controller to an Advanced Memory Buffer (AMB) replace the multi-drop connections. A serial interface from the memory controller to the AMB reduces pin count on the memory controller and simplifies some bus routing. Each memory component contributes its portion of the entire word width.

The FB-DIMM systems introduce their own problems, however. For example, the memory controller cannot write directly to the memory components and must first write to the AMB, which generally increases cost and design complexity. Furthermore, the AMB hinders high speed operation because the process of buffering by the AMB, followed by subsequent analysis and re-sending according to a queue, introduces latency.

Yet another issue with some existing memory systems, is that the memory controller must have a data width matching the data width of each memory component. For example, a one hundred and forty four bit memory controller is compatible with one hundred and forty four bit memory, which means that the data pin count of the memory controller matches the data pin count of each memory component. As a result, device manufacturers must obtain memory components matched to the memory controller, and a high pin count on the memory controller means a high pin count for each memory component.

SUMMARY OF THE INVENTION

In an embodiment, an apparatus includes a memory controller configured to control first and second memory components. A point-to-point data bus configured to pass data between the memory controller and the memory components may include a direct connection from each memory component to the memory controller. The point-to-point data bus can be a serial bus. In an embodiment, a daisy chained address bus configured to pass commands between the memory controller and the memory components may include a direct connection from the first memory component to the memory controller and a daisy chain connection from the first memory component to the second memory component.

DESCRIPTION OF EXAMPLE EMBODIMENTS

Several examples of the present application will now be described with reference to the accompanying drawings. Various other examples of the invention are also possible and practical. This application may be exemplified in many different forms and should not be construed as being limited to the examples set forth herein.

Figure 1:
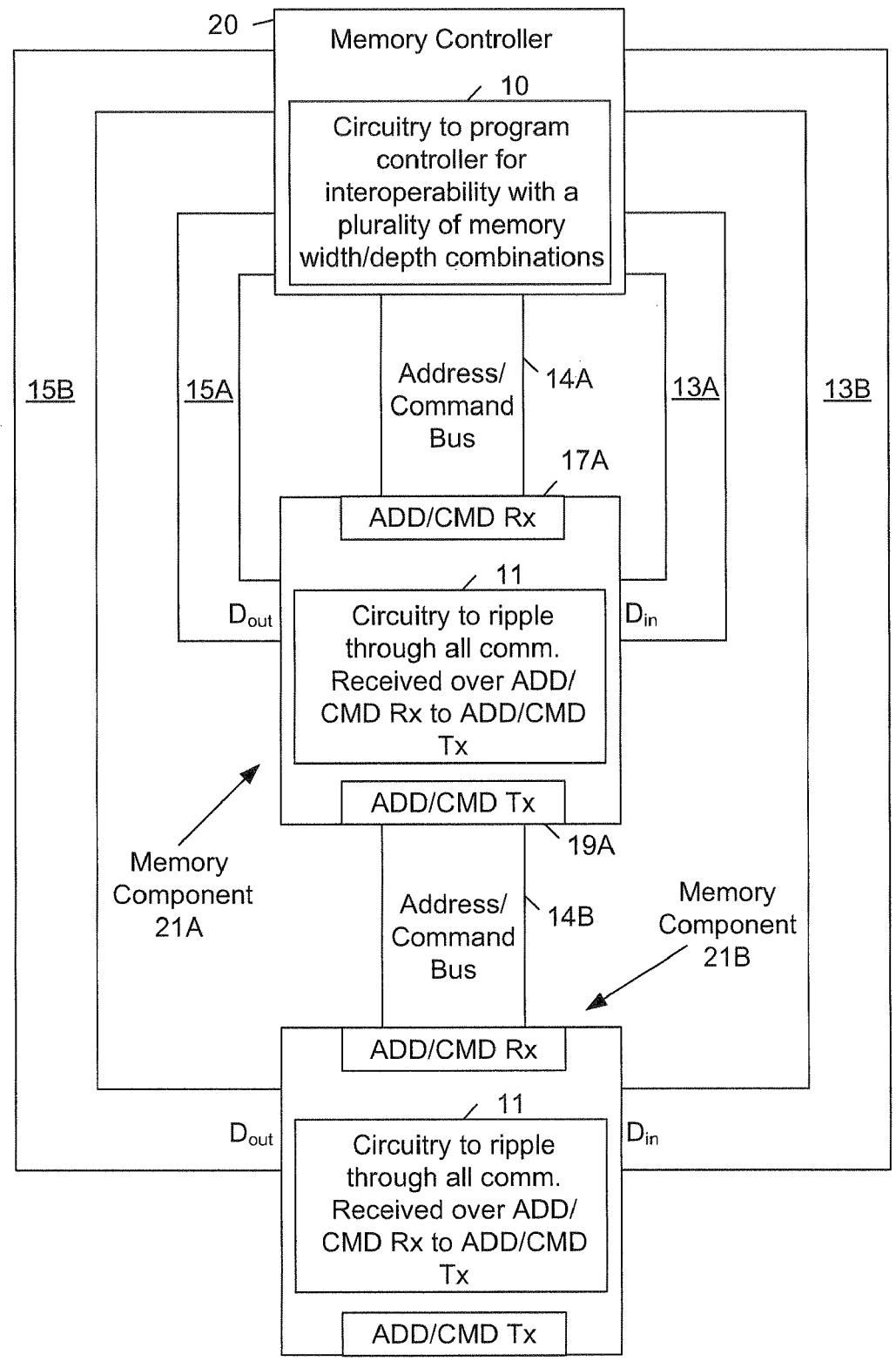
FIG. 1 illustrates a point-to-point memory architecture having memory components daisy-chained to a low latency address bus according to an embodiment.

FIG. 1 illustrates a point-to-point memory architecture having memory components daisy-chained to a low latency address bus according to an embodiment.

The system 100 includes a memory controller 20 having point-to-point connections to a plurality of memory components 21A and 21B, which can be any type of discrete integrated circuits used for storage. With respect to the address/command bus 14A-B, the memory components 21A and 21B are daisy chained to the memory controller 20, meaning that only the first memory component 21A may be directly connected to a command interface of the memory controller 20. With respect to the data bus 13A-B and 15A-B, however, each of the memory components 21A and 21B are directly connected, meaning that all of the memory components 21A and 21B may be directly connected to a data interface of the memory controller 20.

The first memory component 21A includes a circuitry 11 configured to immediately ripple through all commands received over the address bus 14A. The circuitry 11 can be an internal connection between the address/command receiver 17A and the address command transmitter 19A. Since these commands can be immediately rippled through, e.g. there is no queuing and/or buffering needed, the memory component 21B can receive re-transmitted commands over bus 14B with minimal added latency. It should be apparent that the circuitry 11 is not burdened with complex analysis to determine which commands are to be rippled through.

In the system 100, the width of the data interfaces on the memory components 21A and 21B is a fraction of a width of the data interface of the memory controller. For example, the point-to-point data buses 13A and 15A can connect to an initial portion of a data interface on the memory controller 20, while the remaining memory component 21B connects to the remaining portion of the data interface via the data buses 13B and 15B. Accordingly, the memory components 21A and 21B may have a fraction of the pin count of the memory controller 20. Also, the width of the data buses extending to and from each memory component 21A and 21B may be a fraction of the width of the computing system.

It should be appreciated that, unlike conventional systems, the system 100 provides flexibility in that the width of the memory component 21A and 21B may be different than the width of the memory controller 20. This quality allows the memory controller 20 to be configured with software or circuitry 10 that allows the controller 20 to be programmed for interoperability with a plurality of memory width/depth combinations. An example will be shown in FIG. 2 to illustrate how the circuitry 10 can be used to expand the depth of a memory system. An example will be shown in FIG. 4 to illustrate how the circuitry 10 can be used to expand the width of a memory system.

Referring still to FIG. 1, in the present system 100, the buses 13A, 13B, 15A, and 15B are serial buses. However, it should be apparent that it is both possible and practical to apply the principals described above to systems containing parallel data buses.

It should also be appreciated that memory components 21A and 21B can be architecturally identical. It should be apparent that this provides ease of configuration and ease of manufacture.

The system 100 is particularly suited to the networking environment where relatively large word widths, e.g. one hundred and forty four bits, are used. In such an environment, the reduced number of links routed to each memory component is particularly helpful. It should be apparent that, by comparison to some conventional systems the present system 100 uses 1/Nth the number of links routed to each memory component, where N is equal to the number of memory components used. Although the principals described herein are applicable in the networking environment and other environments using relatively high bit width, it is both possible and practical to apply the principals described herein to any memory systems, such as thirty two bit memory systems.

In the networking environment the memory components to be accessed are typically Static Random Access Memory (SRAM). However, it is both practical and possible to apply the principals describe herein to any type of memory including, but not limited to, DRAM, flash memory, etc.

Figure 2:
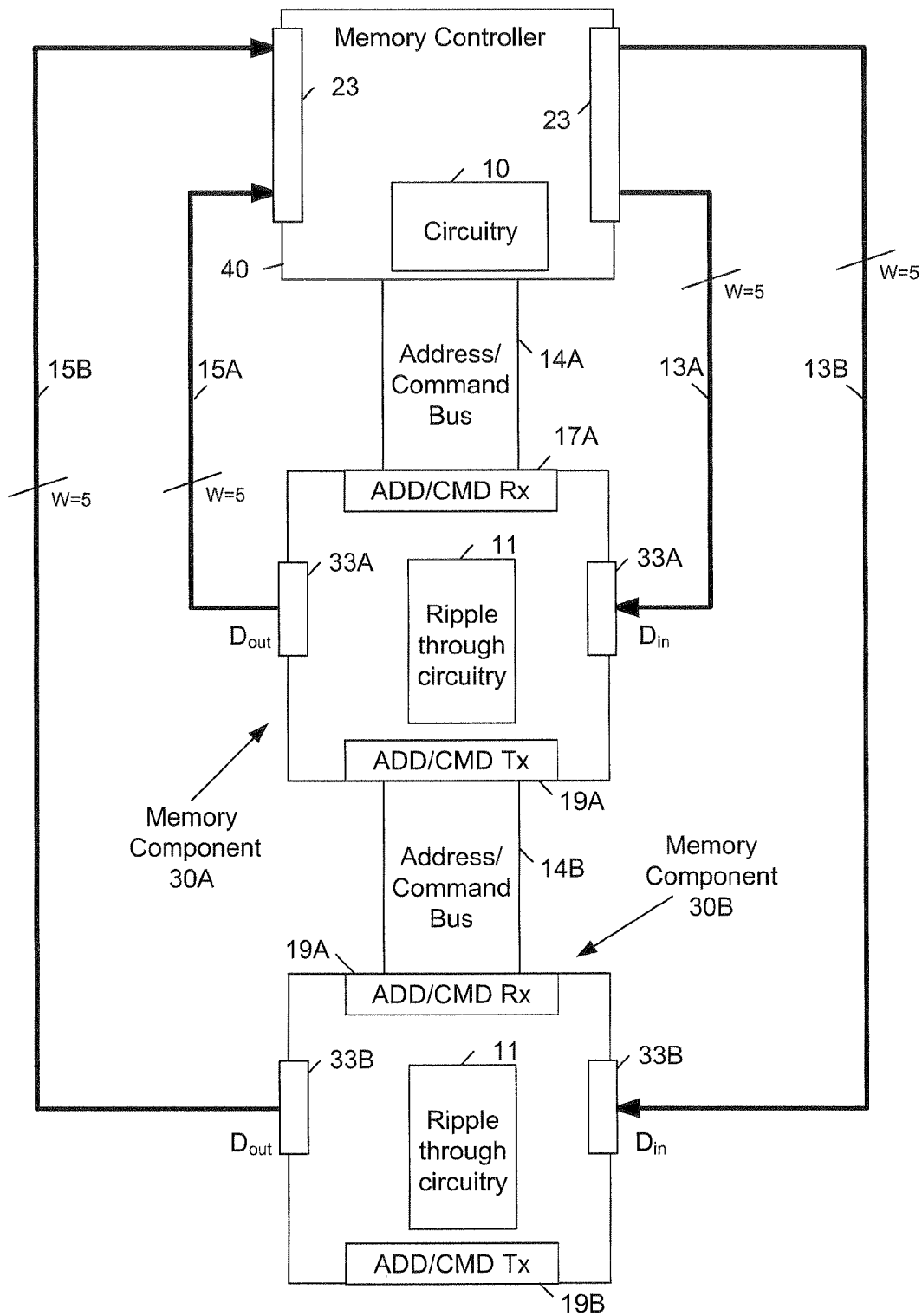
FIG. 2 illustrates memory depth expansion using the point-to-point memory architecture of FIG. 1.

FIG. 2 illustrates memory depth expansion using the point-to-point memory architecture of FIG. 1.

The example system 200 expands memory depth by operating two forty bit memory components 30A and 30B with an eighty bit memory controller 40. By way of background, memory depth refers to the number of bits available for each bit of width. The system 200 effectively doubles memory depth by accessing a word using two memory components instead of one. The following paragraphs provide an example of a write operation in the system 200.

To cause a word to be written to memory, the memory controller 40 sends the word out over the interface 23. The first forty bits of the word are sent over the bus 13A, which in the present example is a serial bus having five serial links. The second forty bits of the word are sent over a different portion of the same interface 23 and over the other bus 13B. The two halves of the word are respectively received at interfaces 33A and 33B.

The controller 40 also sends a single write communication over the address bus 14A. The single write communication provides the memory space addresses to write the word. Since the address space extends over two memory components, the addresses contained in the write communication correspond to locations in both memories.

The memory component 30A receives the write communication over the receiver 17A. The memory component 30A acts on the write communication as it corresponds to a location on the component 30A thereby writing the first half of the word to that local location.

The circuitry 11 also ripples the write communication through to the transmitter 19A for re-transmission over the bus 14B. Instead of spending latency determining which portion of the write communication corresponds to the component 30B, the circuitry 30A re-transmits the entire write communication via the transmitter 19A. The operation is similar to a loop back technique used to self test a wireless transceiver's transmitter and receiver.

The component 30B writes the remaining half of the word (received over input interface 33B) according to the write communication from the bus 14B. For ease of manufacturing and interchangeability it is possible that the memory component 30B may contain the circuitry 11 as well, although in the present example with two components there is no bus connected to the transmitter 19B.

A read command operates in a similar fashion. After receiving the read communication over the buses 14A and 14B, the memory components 30A and 30B output the requested word over the interfaces 33A and 33B.

The transmission latency associated with the data buses 13A-B and the address buses 15A-B can be different, in particular, because of latency added by rippling through the commands. For this and other reasons, a compensation technique can be used to avoid misalignment of the command and the data. For example, the memory component 30A can be configured to impose a delay on the data received over the bus 13A to align this data with the command received over the receiver 17A. The memory component 30B can impose a longer delay on the data received over the bus 13B to align this data with the command received over the address bus 14B as this command will be received later in time than the command received by the memory component 30A. This delay can be implemented using registers, First In First Out (FIFO) buffers, or any other known mechanism for imposing a delay. The delay can be programmable on each memory component depending on that memory components position along the daisy chain.

Another type of imposed delay that can be used is a delay by the memory controller 40 to ensure that data received over the buses 15A-B can be associated with the command sent over the address bus 14A. The delay applied by the memory controller 40 corresponds to the delay applied by the memory components as the memory component's delay affects the difference in time between the memory controller 40 transmitting the command and receiving back the data.

It should be apparent that the depth expansion can be performed even when the memory components have the same width as the memory controller. For example, if the memory components 30A and 30B were manufactured as eighty bit components, half of the interfaces 33A and 33B could be powered down.

It should be apparent that the circuitry 10 allows the memory controller 40 to be programmed for the above described depth expansion. Accordingly, the controller 40 can interface with, for example, an eighty bit wide memory component, two forty bit wide memory components, four twenty bit wide memory components, etc. It should be understood that the circuitry 10 can also be used to program the memory components to use a reduced number of inputs and outputs, thus increasing the memory depth by the same ratio, e.g. the depth at forty bits will be 2× the depth at eight bits and the depth at twenty bits will be 4× the depth at eighty bits. Depending on the configuration, the system 200 will have different memory depth.

It should be apparent that the system 200 can be implemented by updating existing memory controllers with software configured for the above described functionality. The software may account for a latency difference. Otherwise existing controllers do not specify any hardware change to receive words from two or more components.

Figure 3:
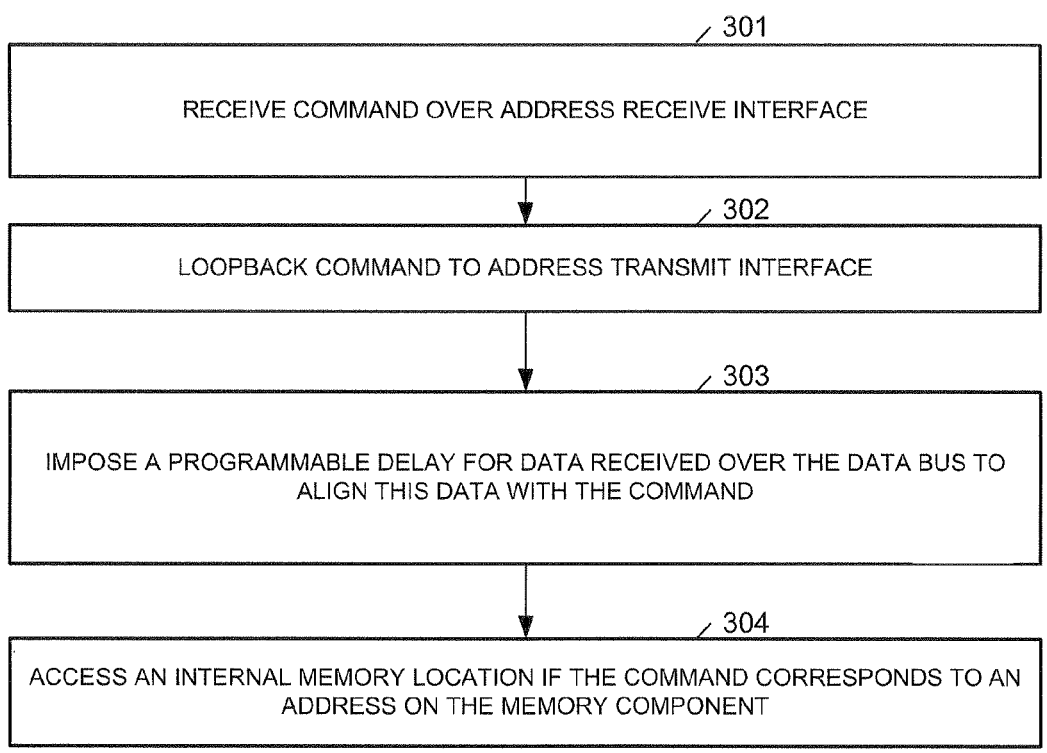
FIG. 3 illustrates a process for using the initial memory component of FIG. 1.

FIG. 3 illustrates a process for using the initial memory component of FIG. 1.

In block 301, the memory component receives a command over the address receive interface. In block 302, the memory component loops back the command to an address transmit interface.

In block 303 the memory component can impose a programmable delay to data received over the data interface. This programmable delay is to align the received data with the command received over the address receive interface. The duration of this delay is dependent on the memory component's position along the daisy chain. In block 304, the memory component accesses a memory location according to the command if the command corresponds to a local address location.

Depending on the tolerance built into the system and on other factors such as the differences in lengths of the data buses to the different memory components, operating frequency, and the total number of memory components connected in series along the address bus, block 303 may not be needed. For example, some systems tolerate misalignment of up to ten times the cycle time, e.g. ten nanoseconds in a system with a ten Gigahertz operating frequency.

The programmed amount can be set according to empirical analysis of measured latency for each memory component propagating received commands. Accordingly, counting outwards from the initial memory component, each memory component is programmed to impose a progressively larger programmable delay with the last memory component in the series programmed to impose the largest delay.

The programmable delay can also be computed by each memory component according to inputs. For example, based on an input indicating the amount of memory components connected in series along the address bus as well as an indication of the memory component's position in the series, the memory component can determine a time delay to be imposed.

Figure 4:
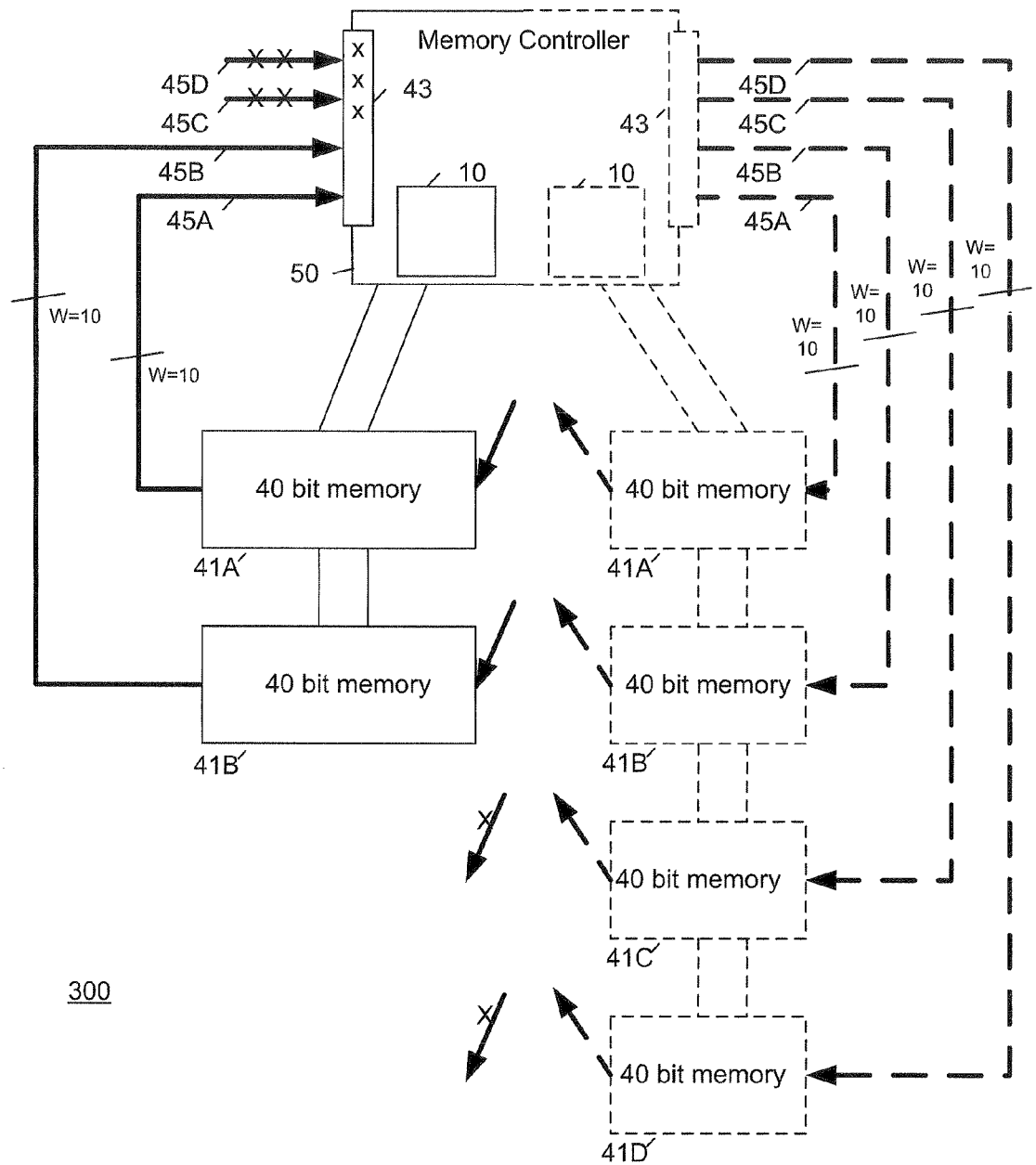
FIG. 4 illustrates memory width expansion using the point-to-point memory architecture of FIG. 1.

FIG. 4 illustrates memory width expansion using the point-to-point memory architecture of FIG. 1.

The example system 300 is used to illustrate width expansion, or width adjustment, using the circuitry 10 on the memory controller 50. In the present example, the memory controller 50 is a one hundred and sixty bit memory controller that can operate in a plurality of bit width modes, including a first eighty bit mode as indicated by the solid lines and a second one hundred and sixty bit mode as indicated by the dashed lines, In the first mode, the system 300 operates as an eighty bit wide system. Since the controller 43 is operating with forty bit memories 41A-B, certain buses (45C-D) and interface portions of the interface 43 can be disabled for power savings as indicated by the "x" markings. It should be apparent that some of the data bus connections and part of the memory controller 50 in the first mode have been shown for ease of illustration.

In the second mode, the system 300 can operate with as a one hundred and sixty bit wide system using similar hardware. Specifically, the width may be adjusted to one hundred and sixty bits by using two additional memories (41C-D), and by powering the memory controller's entire data interface 43 and all the data buses 45A-D. It should be apparent that some of the data bus connections and part of the memory controller 50 in the second mode have been shown for ease of illustration.

Accordingly, it should be apparent that the circuitry 10 provides the capability for width adjustment. Either mode can be selected using the circuitry 10 thus allowing the same hardware to be used for different bit wide systems depending on user preference and application needs. It should be understood that there is no limitation to the amount of modes that can be provided by the circuitry 10, for example, the circuitry 10 can configure the system 300 for a third mode of forty bits with the memory component 41A utilized.

Several examples have been described above with reference to the accompanying drawings. Various other examples of the invention are also possible and practical. The system may be exemplified in many different forms and should not be construed as being limited to the examples set forth above.

The figures listed above illustrate examples of the application and the operation of such examples. In the figures, the size of the boxes is not intended to represent the size of the various physical components. Where the same element appears in multiple figures, the same reference numeral is used to denote the element in the figures where it appears.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. However, there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in embodiments thereof, it should be apparent that the disclosure may be modified in arrangement and detail without departing from such principles. Modifications, equivalents and variations coming within the spirit and scope of the following claims are claimed.

The invention claimed is:

1. An apparatus, comprising:
a memory controller configured to control first and second memory components;
a point-to-point data bus configured to pass data between the memory controller and the memory components, the point-to-point data bus having a direct connection from each memory component to the memory controller; and a daisy chained address bus configured to pass commands between the memory controller and the memory components, the address bus having a direct connection from the first memory component to the memory controller and a daisy chain connection from the first memory component to the second memory component, wherein each memory component has a data interface connected to the point-to-point data bus, wherein if the apparatus is set to depth expansion a portion of each data interface is de-powered while the memory components exchange data with the memory controller over the data bus, wherein if the apparatus is not set to depth expansion the entire data interfaces are powered while the memory components exchange data with the memory controller over the data bus.

2. The apparatus of claim 1, wherein the first memory component further comprises:
  a receiver connected to the address bus, the receiver configured to communicate with the memory controller over the direct connection of the address bus;
  a transmitter connected to the address bus, the transmitter configured to communicate with the second memory component over the daisy chain connection of the address bus; and
  circuitry configured to internally link the first memory component receiver and the first memory component transmitter such that all commands received via the receiver are retransmitted using the transmitter.

3. The apparatus of claim 2, wherein all the commands are re-transmitted independently of whether the received address command corresponds to an address location of the second memory component.

4. The apparatus of claim 1, wherein a count of active pins of a data interface of the memory controller is greater than a count of active pins of the data interface of one of the memory components.

5. The apparatus of claim 4, wherein the count of active pins of the data interface of the memory controller is equal to the combined count of active pins of every connected memory component.

6. The apparatus of claim 1, wherein the point-to-point data bus is a serial bus.

7. An apparatus, comprising:
  a memory controller configured to control first and second memory components;
  a point-to-point data bus configured to pass data between the memory controller and the memory components, the point-to-point data bus having a direct connection from each memory component to the memory controller; and
  a daisy chained address bus configured to pass commands between the memory controller and the memory components, the address bus having a direct connection from the first memory component to the memory controller and a daisy chain connection from the first memory component to the second memory component,
  wherein the memory controller has N memory components coupled thereto over the daisy chain address bus, and each memory component has a data interface connected to the data bus, wherein each data interface has 1/Nth the bit width of the memory controller, and the memory controller circuitry configured to set a memory system depth, the circuitry to cause the memory controller to distribute a data word to be written over both memory components if the memory controller is set to depth expansion, the circuitry to cause the memory controller to write the data word to a single one of the memory components if the memory controller is not set to depth expansion.

8. An apparatus, comprising:
  a memory controller configured to control first and second memory components;
  a point-to-point data bus configured to pass data between the memory controller and the memory components, the point-to-point data bus having a direct connection from each memory component to the memory controller; and
  a daisy chained address bus configured to pass commands between the memory controller and the memory components, the address bus having a direct connection from the first memory component to the memory controller and a daisy chain connection from the first memory component to the second memory component,
  wherein the memory controller has N memory components coupled thereto over the daisy chain address bus, and each memory component has a data interface connected to the data bus, wherein each data interface has 1/Nth the bit width of the memory controller, and the memory controller circuitry configured to set a memory system width, the circuitry to cause the memory controller to exchange data through a first portion of a local data interface if the memory controller is set to width expansion, the circuitry to cause the memory controller to exchange data through a second smaller portion of the local data interface if the memory controller is not set to width expansion.

9. A local data storage component, comprising:
  a data interface configured to directly connect to a memory controller via a point-to-point data bus, the data interface connected directly to the memory controller independently of any intermediary devices;
  a command receive interface configured to receive commands via an address bus;
  a command transmit interface configured to connect to a remote data storage component; and
  circuitry configured to pass the commands received over the receive interface to the transmit interface for re-transmission to the remote data storage component;
  wherein the remote data storage component has a data interface connected to the point-to-point data bus, and wherein if the memory controller is set to depth expansion a portion of each data interface is de-powered while the data storage components exchange data with the memory controller over the data bus, and if the memory controller is not set to depth expansion the entire data interfaces are powered while the data storage components exchange data with the memory controller over the data bus.

10. The local data storage component of claim 9, wherein the circuitry is configured to pass the commands independently of which data storage component the commands correspond to.

11. The local data storage component of claim 9, wherein the data interface has a first bit width and the local data storage component is configured to operate with a memory controller having a second bit width that is larger than the first bit width.

12. The local data storage component of claim 9, wherein the local data storage component is configured to read stored data or write received data according to the retransmitted command.

13. The local data storage component of claim 9, wherein the local data storage component is configured to operate on data comprising a fraction of a word width of data operated on by the memory controller.

14. A method, comprising:
connecting a plurality of memory components in series on a memory controller's address bus, the initial memory component in the series to receive all commands sent from the memory controller and for the memory components;
connecting a data interface on each of the plurality of memory components to the memory controller through a plurality of data buses; and
if the memory controller is set to depth expansion depowering a portion of each data interface while the memory components exchange data with the memory controller over the data bus;
if the memory controller is not set to depth expansion powering the entire data interfaces while the memory components exchange data with the memory controller over the data bus,
such that each memory component can receive data to be written independently of the other memory components.

15. The method of claim 14, further comprising configuring the memory components to propagate received commands such that every memory component receives the same commands received by all of the other memory components.

16. The method of claim 15, further comprising:
configuring the memory components to impose programmable delays to align received data with received commands;
wherein the memory components are configured to impose different, progressively larger delays staring with an initial memory component of the series being configured to impose the least delay and ending with the last memory component of the series being configured to impose the greatest delay.

17. The method of claim 14, wherein the pin count of each memory component is less than the pin count of the memory controller.

18. The method of claim 17, wherein each of the data buses are connected to a different subset of data pins on a data interface of the memory controller.

* * * * *